US011858097B2

(12) United States Patent
Shen

(10) Patent No.: US 11,858,097 B2
(45) Date of Patent: Jan. 2, 2024

(54) ADJUSTMENT-FREE SNAP RING PLIERS JAWS

(71) Applicant: ZHUJI ITOP HARDWARE TOOLS CO., LTD., Zhuji (CN)

(72) Inventor: Yuejuan Shen, Zhuji (CN)

(73) Assignee: ZHUJI ITOP HARDWARE TOOLS CO., LTD., Shaoxing (CN)

( * ) Notice: Subject to any disclaimer, the term of this patent is extended or adjusted under 35 U.S.C. 154(b) by 247 days.

(21) Appl. No.: 16/948,231

(22) Filed: Sep. 9, 2020

(65) Prior Publication Data

US 2021/0069871 A1 Mar. 11, 2021

(30) Foreign Application Priority Data

Sep. 9, 2019 (CN) ......................... 201921496705.1

(51) Int. Cl.
*B25B 7/22* (2006.01)
*B25B 7/02* (2006.01)

(52) U.S. Cl.
CPC . *B25B 7/22* (2013.01); *B25B 7/02* (2013.01)

(58) Field of Classification Search
CPC .... B25B 7/02; B25B 7/12; B25B 7/22; B25B 27/10; B26B 17/006; B26B 17/02; B25F 1/003; B21D 39/04
See application file for complete search history.

(56) References Cited

U.S. PATENT DOCUMENTS 1,079,997 A * 12/1913 Wernimont ........... A47J 43/283 81/416
1,334,425 A * 3/1920 Wernimont ............. B25F 1/003 81/305
1,388,398 A * 8/1921 Adams ................. H02G 1/1214 81/332
6,618,885 B1 * 9/2003 Blaustein ............. H02G 1/1214 81/9.41
8,015,853 B2 * 9/2011 Steiner ....................... B25B 7/04 72/479
2006/0156474 A1 * 7/2006 Gillingham ............ A62B 3/005 7/129

(Continued)

FOREIGN PATENT DOCUMENTS

CN 207710606 U 8/2018

*Primary Examiner* — Robert J Scruggs
(74) *Attorney, Agent, or Firm* — Schwegman Lundberg & Woessner, P.A.

(57) ABSTRACT

An adjusting-free clamp pliers jaw, the first and second pliers bodies rotating on the base and the first and second pliers bodies being mirror symmetrical, the clamping rim is provided on both the first and second pliers bodies, the extrusion notch is provided on both the first and second pliers bodies, the clamping rims on the first and second pliers bodies are jointly used for clamping a clamp, and the extrusion notches on the first and second pliers bodies are used for jointly pinching off the clamp. The invention brings following benefits that: the clamping rims and the extrusion notches are arranged on the first and second pliers bodies, so that a clamping and breaking of the clamp from the extrusion can are realized and both the crimping and shearing functions can be integrated together without a conversion operation, and an operation of this device is simple, convenient and quick.

7 Claims, 3 Drawing Sheets

(56) References Cited

U.S. PATENT DOCUMENTS

| | | | | |
|---|---|---|---|---|
| 2008/0216548 | A1* | 9/2008 | Steiner | B25B 7/12 72/409.12 |
| 2010/0175516 | A1* | 7/2010 | Zhang | B26B 17/02 81/402 |
| 2015/0240519 | A1* | 8/2015 | Johnstone | B25B 7/22 7/117 |
| 2019/0202036 | A1* | 7/2019 | Shen | B25F 1/003 |

* cited by examiner

ADJUSTMENT-FREE SNAP RING PLIERS JAWS

CROSS-REFERENCE TO RELATED APPLICATIONS

This Non-provisional application claims priority under 35 U.S.C. § 119(a) to Chinese Patent Application No. 201921496705.1 filed on Sep. 9, 2019, the entire contents of which are hereby incorporated by reference in their entirety.

FIELD

The invention relates to a field of a hardware tool, in particular to an adjusting-free clamp pliers jaw.

BACKGROUND

A clamp pliers with a crimping and shearing function is provided in Patent CN2017219168145, which is able to achieve a crimping and shearing of a clamp, but requires an adjusting of a position of an eccentric shaft (a reference number of which is 4 in the patent document) when switching between the crimping and shearing, which not only is cumbersome in practice (the eccentric shaft should be adjusted every time the function is switched), but also tends to incur mistakes in operation by an unskilled worker.

SUMMARY

In view of the problems discussed above, the invention provides an adjusting-free clamp pliers jaw.

The invention adopts the following technical scheme:

An adjusting-free clamp pliers jaw, which comprises a first pliers body, a second pliers body and a base, both the first and second pliers bodies rotating on the base and the first and second pliers bodies being mirror symmetrical, wherein it further comprises a clamping rim and an extrusion notch, wherein the clamping rim is provided on both the first and second pliers bodies, the extrusion notch is provided on both the first and second pliers bodies, and the clamping rims on the first and second pliers bodies are jointly used for clamping a clamp, and the extrusion notches on the first and second pliers bodies are used for jointly pinching off the clamp.

In this device, the clamping rims and extrusion notches are respectively arranged on the first and second pliers bodies, a clamping of the clamp can be made by the clamping rims on the first and second pliers bodies (which is equivalent to a "crimping" of the clamp described in patent CN2017219168145), an extruding of the clamped clamps can be made by the extrusion notches on the first and second pliers bodies, and the clamped clamps can be pinched off by an extrusion action of the extrusion notches (this process is equivalent to the shearing of the clamp described in patent CN2017219168145). Specifically, the device only provides a pliers jaw, which can only be used after other structures such as pliers handles are installed.

In this scheme, the clamping rims and the extrusion notches are arranged on the first and second pliers bodies, so that a clamping and breaking of the clamp from the extrusion can are realized and both the crimping and shearing functions can be integrated together without a conversion operation, and an operation of this device is simple, convenient and quick.

Optionally, the extrusion notch is an arc-shaped extrusion notch.

Optionally, the base comprises a first bottom plate, a second bottom plate and a bolt assembly, wherein the first bottom plate and the second bottom plate are connected with each other by the bolt assembly, the first bottom plate and the second bottom plate are parallel to each other between which the first and second pliers bodies are positioned, and the first and second pliers bodies are respectively rotatably arranged on screws of the bolt assembly through their own through holes.

Optionally, it also comprises a rotating notch and a center post, wherein the center post is arranged between the first bottom plate and the second bottom plate and perpendicular to the first bottom plate, the rotation notch is arranged on both the first and second pliers bodies, and the rotation notch of the first pliers body and the rotation notch of the second pliers body abut against the central post.

The above design is made to ensure the first and second pliers bodies to be more stable during a rotation.

Optionally, the first bottom plate abuts against the extrusion notches on the first and second pliers bodies.

In the above configuration, it can be ensured that the clamp abuts against the first bottom plate when the clamp is extruded by the extrusion notches, and the first bottom plate will play a certain role in blocking the clamp, thus ensuring that the clamp cannot be extruded away during pinching off.

Optionally, the first bottom plate abuts against the clamping rims on the first and second pliers bodies.

By abutting the first bottom plate against the clamping rims on the first and second pliers bodies, it can be ensured that the clamp doesn't shake during a clamping of the rims and can keep the clamp stable during the clamping.

The invention brings benefits that: the clamping rims and the extrusion notches are arranged on the first and second pliers bodies, so that a clamping and breaking of the clamp from the extrusion can are realized and both the crimping and shearing functions can be integrated together without a conversion operation, and an operation of this device is simple, convenient and quick.

Figure 1:
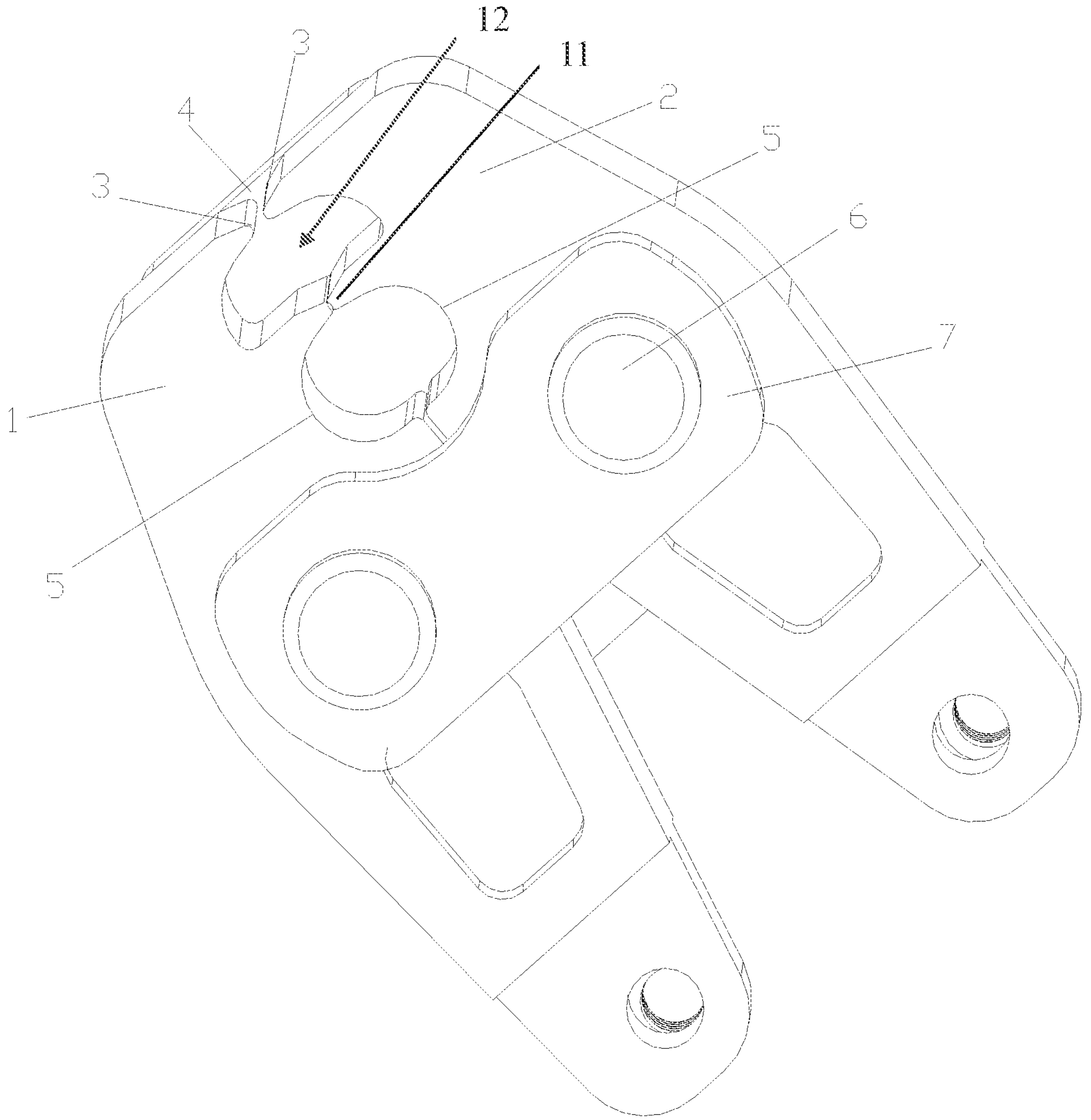
FIG. 1 is a schematic diagram of the structure of an adjusting-free clamp pliers jaw.

The reference numerals in the figures are: 1. First Pliers Body, 2. Second Pliers Body, 3. Clamping Rim, 4. First Bottom Plate, 5. Extrusion Notch, 6. Bolt Assembly, 7. Second Bottom Plate, 8. Through Hole, 9. Rotating Notch, 10. Center Post.

DETAILED DESCRIPTION OF PREFERRED EMBODIMENTS

The invention will be described in detail with reference to the drawings.

Figure 2:
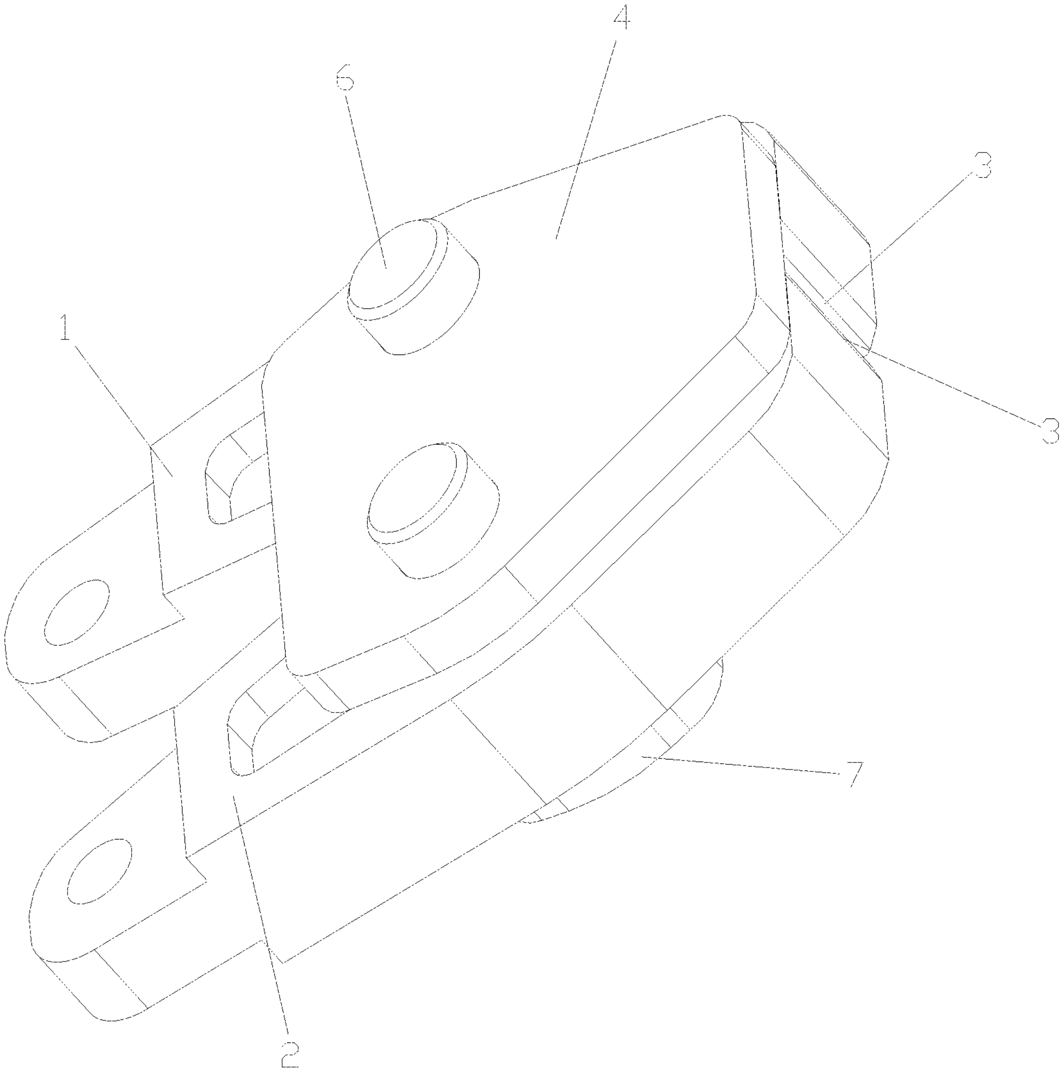
FIG. 2 is a schematic diagram of a positional relationship between the first and second bottom plates.
Figure 3:
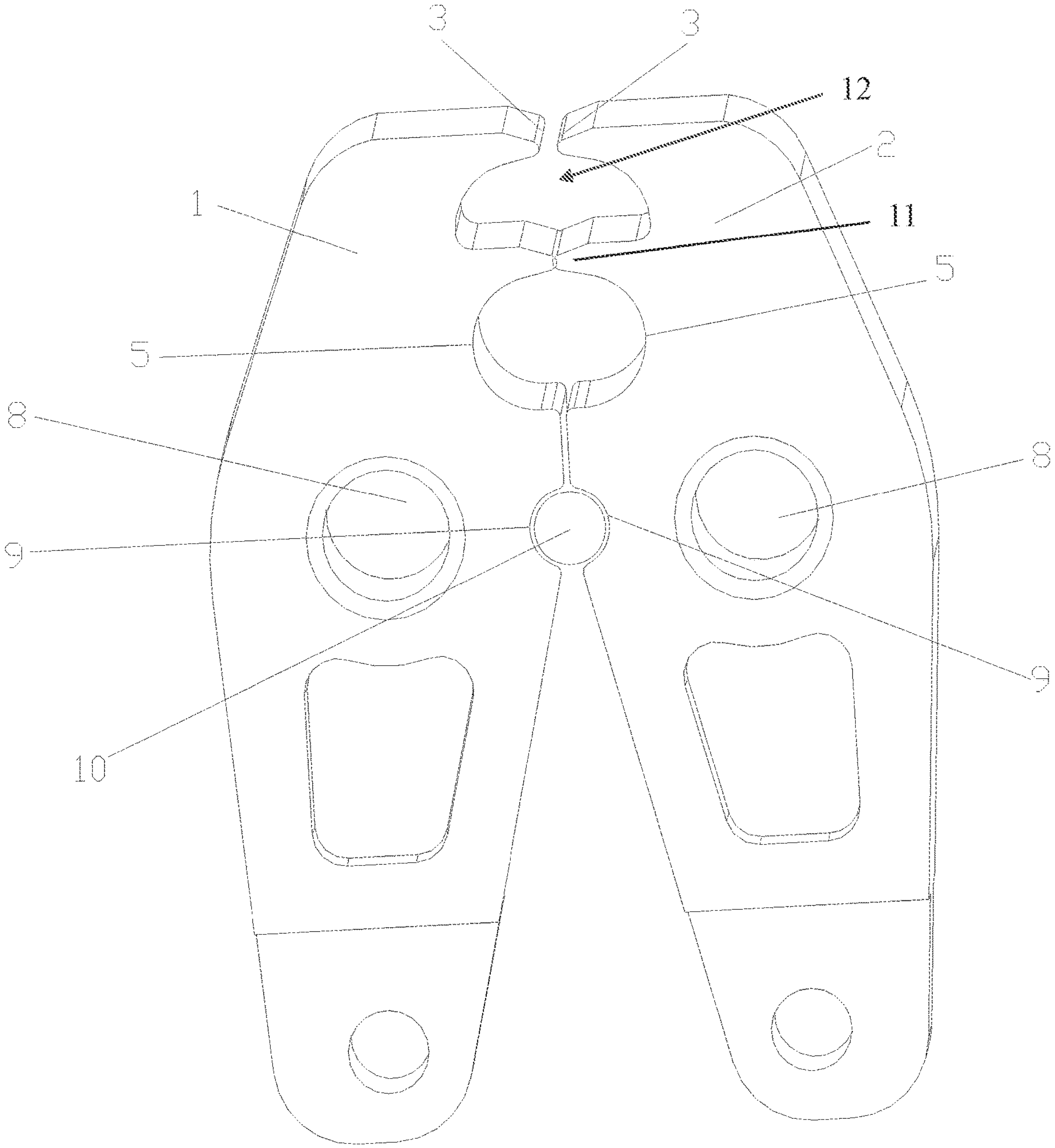
FIG. 3 is a schematic diagram of the positional relationship between the first and second pliers bodies.

As shown in FIGS. 1, 2 and 3, an adjusting-free clamp pliers jaw includes a first pliers body 1, a second pliers body 2 and a base, in which both the first 1 and second 2 pliers bodies rotate on the base and the first 1 and second 2 pliers bodies are mirror symmetrical, and it further includes a clamping rim 3 and an extrusion notch 5, in which the clamping rim 3 is provided on both the first 1 and second 2 pliers bodies, the extrusion notch 5 is provided on both the first 1 and second 2 pliers bodies, and the clamping rims 3 on the first 1 and second 2 pliers bodies are jointly used for clamping a clamp, and the extrusion notches 5 on the first 1 and second 2 pliers bodies are used for jointly pinching off the clamp.

In this device, the clamping rims 3 and extrusion notches 5 are respectively arranged on the first 1 and second 2 pliers bodies, a clamping of the clamp can be made by the clamping rims 3 on the first 1 and second 2 pliers bodies (which is equivalent to a "crimping" of the clamp described in patent CN2017219168145), an extruding of the clamped clamps can be made by the extrusion notches 5 on the first 1 and second 2 pliers bodies, and the clamped clamps can be pinched off by an extrusion action of the extrusion notches 5 (this process is equivalent to the shearing of the clamp described in patent CN2017219168145). Specifically, the device only provides a pliers jaw, which can only be used after other structures such as pliers handles are installed.

Specifically, during an installation for this device, two holes at a bottom (which is referred to a position relationship in FIG. 1) of the first 1 and second 2 pliers bodies are connected with pliers handles, and an installation structure between the two pliers handles is the same as that shown in patent CN2017219168145.

The extrusion notches are formed by the first and second pliers being recessed inwards respectively, an inner wall of the extrusion notch formed by the first plier near the clamping rims and an inner wall of the extrusion notch formed by the second plier near the clamping rims cooperates to form a shearing part 11 to pinch off or shear the clamp.

An accommodation space 12 is set between the shearing part and the clamping rims.

In this scheme, the clamping rims 3 and the extrusion notches 5 are arranged on the first 1 and second 2 pliers bodies, so that a clamping and breaking of the clamp from the extrusion can are realized and both the crimping and shearing functions can be integrated together without a conversion operation, and an operation of this device is simple, convenient and fast.

As shown in FIGS. 1, 2 and 3, the extrusion notch 5 is an arc-shaped extrusion notch 5.

As shown in FIGS. 1, 2 and 3, the base comprises a first bottom plate 4, a second bottom plate 7 and a bolt assembly 6, wherein the first bottom plate 4 and the second bottom plate 7 are connected with each other by the bolt assembly 6, the first bottom plate 4 and the second bottom plate 7 are parallel to each other between which the first 1 and second 2 pliers bodies are positioned, and the first 1 and second 2 pliers bodies are respectively rotatably arranged on screws of the bolt assembly 6 through their own through holes 8.

As shown in FIGS. 1, 2 and 3, it also comprises a rotating notch 9 and a center post 10, wherein the center post 10 is arranged between the first bottom plate 4 and the second bottom plate 7 and perpendicular to the first bottom plate 4, the rotation notch 9 is arranged on both the first 1 and second 2 pliers bodies, and the rotation notch 9 of the first pliers body 1 and the rotation notch 9 of the second pliers body 2 abut against the central post 10.

The above design is made to ensure the first 1 and second 2 pliers bodies to be more stable during a rotation.

As shown in FIGS. 1, 2 and 3, the first bottom plate 4 abuts against the extrusion notches 5 on the first 1 and second 2 pliers bodies.

In the above configuration, it can be ensured that the clamp abuts against the first bottom plate 4 when the clamp is extruded by the extrusion notches 5, and the first bottom plate 4 will play a certain role in blocking the clamp, thus ensuring that the clamp cannot be extruded away during pinching off.

As shown in FIGS. 1, 2 and 3, the first bottom plate 4 abuts against the clamping rims 3 on the first 1 and second 2 pliers bodies.

By abutting the first bottom plate 4 against the clamping rims 3 on the first 1 and second 2 pliers bodies, it can be ensured that the clamp doesn't shake during a clamping of the rims 3 and can keep the clamp stable during the clamping.

The above description is only the preferred embodiments of the present invention and does not limit the patent scope of the present invention, any equivalent structure process modification used according to the contents of the specification and accompanying drawings in the present invention, no matter whether it is directly or indirectly used in any other related technical field, should be included within the protection scope of the present invention.

What is claimed is:

1. An adjusting-free clamp pliers jaw, comprising:

a first pliers body;

a second pliers body; and a base, both the first and second pliers bodies rotating on the base wherein adjusting-free clamp pliers jaw further comprises a clamping rim and an extrusion notch, the clamping rim is provided on both the first and second pliers bodies, the extrusion notch is provided on both the first and second pliers bodies, and clamping rims on the first and second pliers bodies are jointly used for clamping a clamp, and extrusion notches on the first and second pliers bodies are located on a same plane to be used for accommodating part of the clamp when pinching off or shearing the clamp, and the clamping rims do not contact each other when the jaw is in a fully closed position;

wherein the extrusion notches are formed by the first and second pliers being recessed inwards respectively, an inner wall of the extrusion notch formed by the first plier near the clamping rims and an inner wall of the extrusion notch formed by the second plier near the clamping rims cooperates to form a shearing part to pinch off or shear the clamp;

wherein an accommodation space is set between the shearing part and the clamping rims, the accommodation space and the extrusion notches are located on opposite sides of the shearing part, so that a clamping and pinching off or shearing the clamp can be realized without a conversion operation;

wherein the clamping rim on the first plier body and the clamping rim at the second plier body do not have contact with each other.

2. The adjusting-free clamp pliers jaw according to claim 1, wherein each extrusion notch is an arc-shaped extrusion notch.

3. The adjusting-free clamp pliers jaw according to claim 1, wherein the base comprises a first bottom plate, a second bottom plate, and a bolt assembly;

wherein the first bottom plate and the second bottom plate are connected with each other by the bolt assembly, the first bottom plate and the second bottom plate are parallel to each other, the first and second pliers bodies are positioned between the first bottom plate and the second bottom plate, and the first and second pliers bodies are respectively rotatably arranged on screws of the bolt assembly through their own through holes.

4. The adjusting-free clamp pliers jaw according to claim 3, wherein the jaw further comprises a rotating notch and a center post, wherein the center post is arranged between the first bottom plate and the second bottom plate, the center post is perpendicular to the first bottom plate, the rotation notch is arranged on both the first and second pliers bodies, and the rotation notch of the first pliers body and the rotation notch of the second pliers body both abut against the central post.

5. The adjusting-free clamp pliers jaw according to claim 3, wherein the first bottom plate abuts against the extrusion notches on the first and second pliers bodies.

6. The adjusting-free clamp pliers jaw according to claim 3, wherein the first bottom plate abuts against the clamping rims on the first and second pliers bodies.

7. The adjusting-free clamp pliers jaw according to claim 1, wherein the clamping rim on the first plier body and the clamping rim at the second plier body do not have contact with each other.

* * * * *